US011686243B2

(12) United States Patent
Ono et al.

(10) Patent No.: US 11,686,243 B2
(45) Date of Patent: Jun. 27, 2023

(54) ENGINE SYSTEM

(71) Applicant: Mazda Motor Corporation, Hiroshima (JP)

(72) Inventors: Ryohei Ono, Aki-gun (JP); Yuji Harada, Aki-gun (JP); Kenji Uchida, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/864,777

(22) Filed: Jul. 14, 2022

(65) Prior Publication Data

US 2023/0029748 A1    Feb. 2, 2023

(30) Foreign Application Priority Data

Jul. 30, 2021   (JP) ................. 2021-125486

(51) Int. Cl.
*F02B 19/12*    (2006.01)
*F02D 41/40*    (2006.01)
*F02P 5/15*     (2006.01)

(52) U.S. Cl.
CPC ............ *F02B 19/12* (2013.01); *F02D 41/401* (2013.01); *F02P 5/1502* (2013.01); *F02D 2200/101* (2013.01)

(58) Field of Classification Search
CPC .................. F02B 19/1023; F02B 19/12; F02D 2200/101; F02D 37/02; F02D 41/3035; F02D 41/401; F02P 15/02; F02P 15/08; F02P 5/045; F02P 5/1502
See application file for complete search history.

(56) References Cited

U.S. PATENT DOCUMENTS

| 4,180,031 | A  | * | 12/1979 | Muranaka | F02P 15/02 123/638 |
| 4,287,862 | A  | * | 9/1981 | Noguchi | F02B 5/00 123/638 |
| 7,740,009 | B2 | * | 6/2010 | Shelby | F02P 15/08 123/304 |
| 8,006,666 | B2 | * | 8/2011 | Ashida | F02B 19/12 123/638 |

(Continued)

FOREIGN PATENT DOCUMENTS

JP    2007255370 A    10/2007

*Primary Examiner* — Carl C Staubach
(74) *Attorney, Agent, or Firm* — Alleman Hall Creasman & Tuttle LLP (57) ABSTRACT

An engine system is provided, which includes a cylinder block, a cylinder head, a piston, a main combustion chamber, a subchamber, an injector that injects fuel into the main combustion chamber, a main spark plug that ignites a mixture gas inside the main combustion chamber, a subspark plug that ignites the mixture gas inside the subchamber, and a control device. In a low-speed high-load range, a fuel injection timing is set in compression stroke and the main ignition and the subignition are performed after the fuel injection timing, and the fuel injection timing under a low-speed condition becomes later than that under a high-speed condition, and the ignition devices are controlled so that the subignition timing is retarded from the main ignition timing and an ignition phase difference that is the retard amount of the subignition timing becomes larger under the low-speed condition than under the high-speed condition.

15 Claims, 9 Drawing Sheets

(56) References Cited

U.S. PATENT DOCUMENTS

| | | | |
|---|---|---|---|
| 11,156,198 B1* | 10/2021 | Glugla | F02P 3/05 |
| 2002/0038655 A1* | 4/2002 | Suzuki | F02P 15/08 |
| | | | 123/638 |
| 2009/0259387 A1* | 10/2009 | Kakuya | F02D 41/3035 |
| | | | 123/295 |
| 2012/0290195 A1* | 11/2012 | Irie | F02M 26/13 |
| | | | 701/104 |
| 2019/0078498 A1* | 3/2019 | Bedogni | F02B 19/1019 |
| 2019/0323415 A1* | 10/2019 | Corrigan | F01N 3/2006 |
| 2019/0376441 A1* | 12/2019 | Brubaker | F02P 13/00 |
| 2021/0222643 A1* | 7/2021 | Nagatsu | F02P 15/02 |
| 2021/0262393 A1* | 8/2021 | Leone | F02C 7/266 |
| 2022/0213857 A1* | 7/2022 | Ohata | F02P 5/1516 |
| 2023/0029629 A1* | 2/2023 | Ono | F02B 9/02 |
| 2023/0029748 A1* | 2/2023 | Ono | F02P 5/045 |
| 2023/0030297 A1* | 2/2023 | Ono | F02M 26/15 |
| 2023/0035754 A1* | 2/2023 | Ono | F02D 37/02 |
| 2023/0035987 A1* | 2/2023 | Ono | F02P 15/08 |
| 2023/0037098 A1* | 2/2023 | Ono | F02B 19/12 |

* cited by examiner

ENGINE SYSTEM

TECHNICAL FIELD

The present disclosure relates to an engine system provided with a main combustion chamber and a subchamber.

BACKGROUND OF THE DISCLOSURE

Conventionally, in engines mounted on a vehicle, etc., providing a main combustion chamber and a subchamber communicating therewith has been examined, in order to improve fuel efficiency and emission performance. In detail, if the main combustion chamber and the subchamber communicating therewith are provided, and flame generated in the subchamber is blown off to the main combustion chamber, the combustion speed in the main combustion chamber can be increased and fuel efficiency can be improved, and a residue of unburnt mixture gas can be reduced and emission performance can be improved.

For example, JP2007-255370A discloses an engine provided with a main combustion chamber (a main chamber in JP2007-255370A) which is defined by a cylinder block, a cylinder head, and a piston, a subchamber communicating with the main combustion chamber, a main fuel injection valve which is provided to an intake port and supplies fuel to the main combustion chamber via the intake port, a main chamber spark plug which ignites a mixture gas inside the main combustion chamber, a sub fuel injection valve which directly injects fuel into the subchamber, and a subchamber spark plug which ignites the mixture gas inside the subchamber. According to this engine, the mixture gas which is formed inside the main combustion chamber and is comprised of fuel injected from the main fuel injection valve and air, is first ignited by the main chamber spark plug, and the mixture gas which is formed in the subchamber and is comprised of fuel injected from the sub fuel injection valve and air, is then ignited by the subchamber spark plug.

The engine of JP2007-255370A is configured so that fuel is injected individually to the main combustion chamber and the subchamber, and therefore requires two fuel injection valves for each cylinder. Thus, the structure is complicated, and it is disadvantageous in terms of cost. In this regard, for the engine having the main combustion chamber and the subchamber, it is possible to provide the fuel injection valve only to the main combustion chamber. However, according to such a configuration in which the fuel injection valve is provided only to the main combustion chamber, the fuel injected from the fuel injection valve may not be fully introduced into the subchamber, and therefore, the mixture gas may not combust appropriately inside the subchamber. That is, there is a possibility that the improvement effect of the fuel efficiency and the emission performance acquired by providing the main combustion chamber and the subchamber may not fully be acquired.

SUMMARY OF THE DISCLOSURE

The present disclosure is made in view of the above situations, and one purpose thereof is to provide an engine system having a main combustion chamber and a subchamber, capable of securely improving fuel efficiency and emission performance.

According to one aspect of the present disclosure, an engine system is provided, which includes a cylinder block and a cylinder head that form a cylinder, a piston reciprocatably accommodated in the cylinder, a main combustion chamber defined by the cylinder block, the cylinder head, and the piston, a subchamber that is separated from the main combustion chamber by a partition, and communicates with the main combustion chamber through a communicating hole formed in the partition, an injector that injects fuel into the main combustion chamber, a main spark plug that ignites a mixture gas inside the main combustion chamber, a subspark plug that ignites the mixture gas inside the subchamber, and a control device that is electrically connected to, and outputs an electric signal for control to, the injector, the main spark plug, and the subspark plug. When the engine is operated in a specific range where an engine speed is below a given reference engine speed and an engine load is above a given reference load, the control device is adapted to control the injector so that a fuel injection timing that is an injection timing of fuel by the injector is included in compression stroke, and cause the main spark plug and the subspark plug to perform the ignitions after the fuel injection timing, when two conditions in the specific range where the engine loads are the same and the engine speeds are different include a low-speed condition where the engine speed is lower and a high-speed condition where the engine speed is higher, control the injector so that the fuel injection timing under the low-speed condition becomes later than the fuel injection timing under the high-speed condition, and control the main spark plug and the subspark plug so that a subignition timing that is an ignition timing of the subspark plug becomes a timing on the retarding side of a main ignition timing that is an ignition timing of the main spark plug, and an ignition phase difference that is a retard amount of the subignition timing with respect to the main ignition timing becomes larger under the low-speed condition than under the high-speed condition.

In the specific range where the engine speed is below the reference engine speed and the engine load is above the reference load (i.e., low-speed high-load range), when fuel is injected to the main combustion chamber in intake stroke, a preignition in which the mixture gas self-ignites before the ignition by the ignition device occurs easily. Regarding this, according to this configuration, since the fuel injection timing is controlled to be included in compression stroke in the specific range, it can suppress the occurrence of the preignition. In addition, the fuel injection timing under the low-speed condition, where the preignition occurs particularly easily due to the low engine speed, is set later than the fuel injection timing under the high-speed condition, where the preignition occurs comparatively rarely. Thus, the occurrence of the preignition under the low-speed condition can be suppressed more securely. Moreover, under the high-speed condition, while suppressing the occurrence of the preignition, mixing of fuel and air by near a compression top dead center can be stimulated to reduce a residue of unburnt mixture gas.

Here, when the fuel injection is performed in compression stroke, since fuel cannot be spread sufficiently inside the main combustion chamber by near the compression top dead center, it becomes difficult to introduce a sufficient amount of the mixture gas (fuel) into the subchamber with only the compressing action of the piston. In this regard, according to this configuration, the subignition timing is set on the retarding side of the main ignition timing. Thus, the ignition of the main spark plug causes the mixture gas to combust inside the main combustion chamber, and by utilizing the pressure increase in the main combustion chamber accompanying the combustion, the mixture gas (fuel) can be pushed into the subchamber. Therefore, according to this configuration, in the specific range (the low-speed high-load range), while suppressing the occurrence of the preignition, suitable combustion inside the main combustion chamber and the subchamber can be realized, thereby improving fuel efficiency and emission performance.

In addition, according to this configuration, the ignition phase difference that is the retard amount of the subignition timing with respect to the main ignition timing becomes larger under the low-speed condition than under the high-speed condition. That is, the period after the introduction of the mixture gas (fuel) into the subchamber accompanying the pressure increase in the main combustion chamber begins, and until the ignition by the subspark plug is performed, is longer under the low-speed condition where the introduction of the mixture gas (fuel) into the subchamber is more difficult with only the compressing action of the piston because the fuel injection timing is closer to the compression top dead center. Therefore, under the low-speed condition, the sufficient amount of mixture gas (fuel) can securely be introduced into the subchamber to more securely realize the suitable combustion inside the subchamber. Further, under the high-speed condition, the combustion inside the subchamber begins comparatively early after the combustion inside the main combustion chamber begins, and the combustion period can be shortened, thereby more securely improving fuel efficiency.

The control device may set the main ignition timing under the low-speed condition to a timing on the retarding side of the main ignition timing under the high-speed condition, and set the subignition timing under the low-speed condition to a timing on the retarding side of the subignition timing under the high-speed condition.

According to this configuration, under both the low-speed condition and the high-speed condition, the period from the fuel injection timing to the main ignition timing (i.e., the mixing period of fuel with air until the main ignition timing) can be secured, while the ignition phase difference under the low-speed condition can be set larger than that under the high-speed condition. Thus, the suitable combustion inside the main combustion chamber and the subchamber can be realized further securely.

As a concrete implementation to realize the above configuration, the control device may make a retard amount of the subignition timing under the low-speed condition with respect to the subignition timing under the high-speed condition larger than a retard amount of the main ignition timing under the low-speed condition with respect to the main ignition timing under the high-speed condition.

Here, since in expansion stroke the piston is descending, if the subignition timing is set to a timing in expansion stroke, it becomes particularly difficult to introduce a sufficient amount of the mixture gas (fuel) into the subchamber at the subignition timing with only the compressing action of the piston. In this regard, according to this configuration, the mixture gas (fuel) can be pushed into the subchamber by the pressure increase in the main combustion chamber accompanying the combustion as described above. Therefore, also in a configuration in which the control device sets the subignition timing in the specific range to a timing in expansion stroke, the amount of mixture gas (fuel) in the subchamber can be secured.

The control device may control the main spark plug and the subspark plug so that, during operation in the specific range, the ignition phase difference becomes larger as the engine speed becomes lower, and a rate of change in the ignition phase difference with respect to the engine speed becomes larger on the high-speed side than on the low-speed side.

According to this configuration, since the ignition phase difference becomes larger as the engine speed becomes lower, the suitable combustion in the subchamber can be securely realized while achieving excellent fuel efficiency at each engine speed. However, if the ignition phase difference is made excessively large in the configuration in which the subignition timing is set to a timing in the expansion stroke, the subignition timing becomes the excessively late timing in the expansion stroke, and thus the effect of introducing the mixture gas (fuel) into the subchamber becomes smaller and fuel efficiency is lowered. On the other hand, according to this configuration, the rate of change in the ignition phase difference with respect to the engine speed becomes larger on the high-speed side than on the low-speed side. Therefore, it can avoid the ignition phase difference becoming excessively large (i.e., the subignition timing becomes the excessively late timing in the expansion stroke), thereby securely making fuel efficiency appropriate while securing the amount of mixture gas (fuel) introduced into the subchamber.

The control device may set the main ignition timing in the specific range in expansion stroke.

According to this configuration, the period from the fuel injection timing to the main ignition timing (i.e., the mixing period of fuel with air until the main ignition timing) can be secured, thereby further securely realizing the suitable combustion inside the main combustion chamber.

The main spark plug may be attached so that an electrode part thereof is located on an intake port side in a ceiling surface of the main combustion chamber, and the subspark plug may be attached to a position on an exhaust port side in the ceiling surface of the main combustion chamber.

The injector may be disposed so that a tip-end part thereof is located at the center of the ceiling surface of the main combustion chamber.

DETAILED DESCRIPTION OF THE DISCLOSURE

Entire Configuration of Engine

Figure 1:
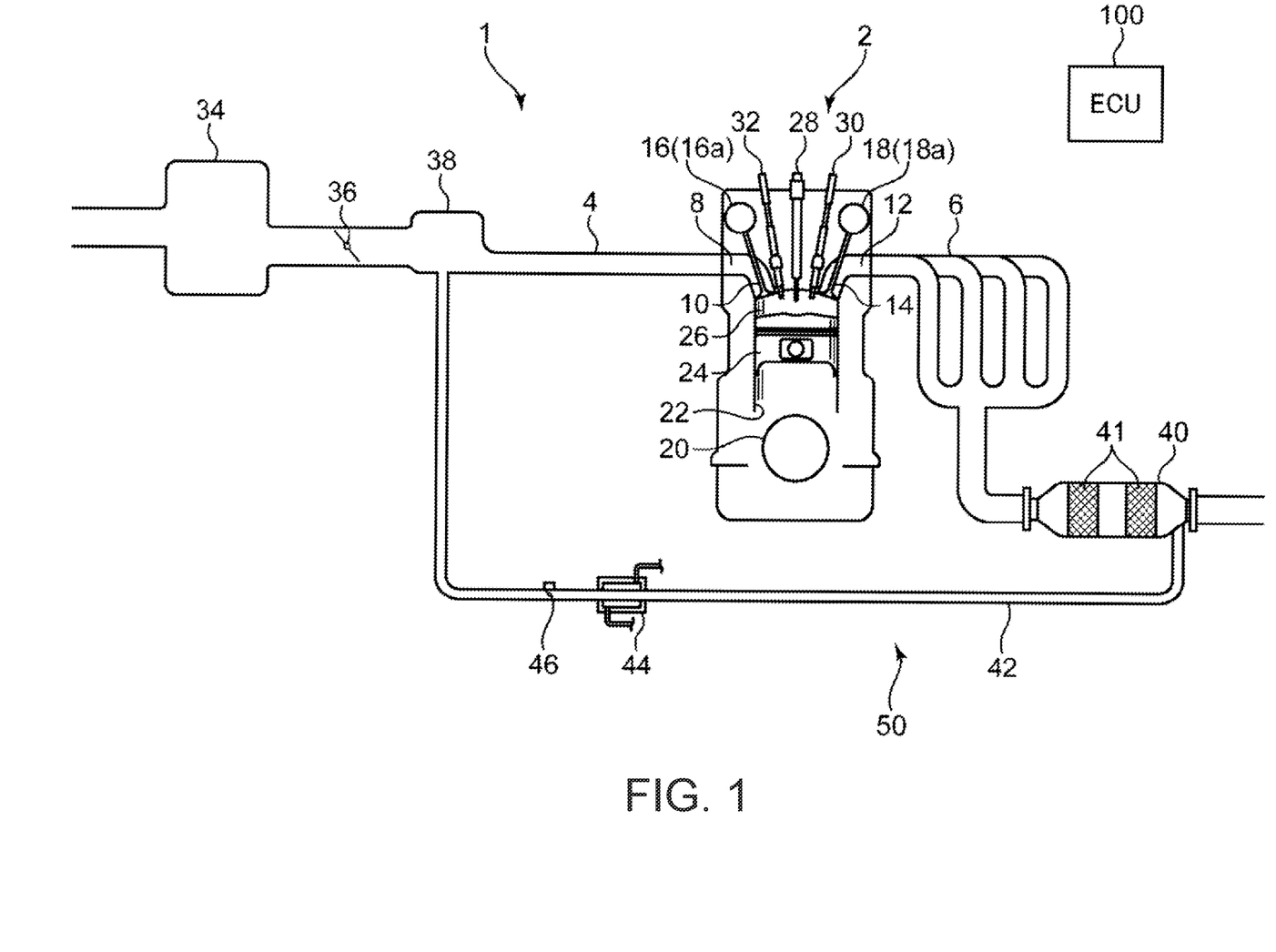
FIG. 1 is an outline block diagram of an engine system according to one embodiment of the present disclosure.

FIG. 1 is an outline block diagram illustrating a desirable embodiment of an engine system of the present disclosure.

An engine system 1 includes an engine body 2, an intake passage 4 through which air introduced into the engine body 2 (intake air) circulates, an exhaust passage 6 through which exhaust gas drawn from the engine body 2 circulates, and an exhaust gas recirculation (EGR) device 50. The engine system 1 is mounted on a vehicle, for example, as a power source for propelling the vehicle. The engine body 2 is a four-stroke gasoline engine which mainly uses gasoline as fuel, and fuel containing gasoline is supplied to the engine body 2.

Figure 2:
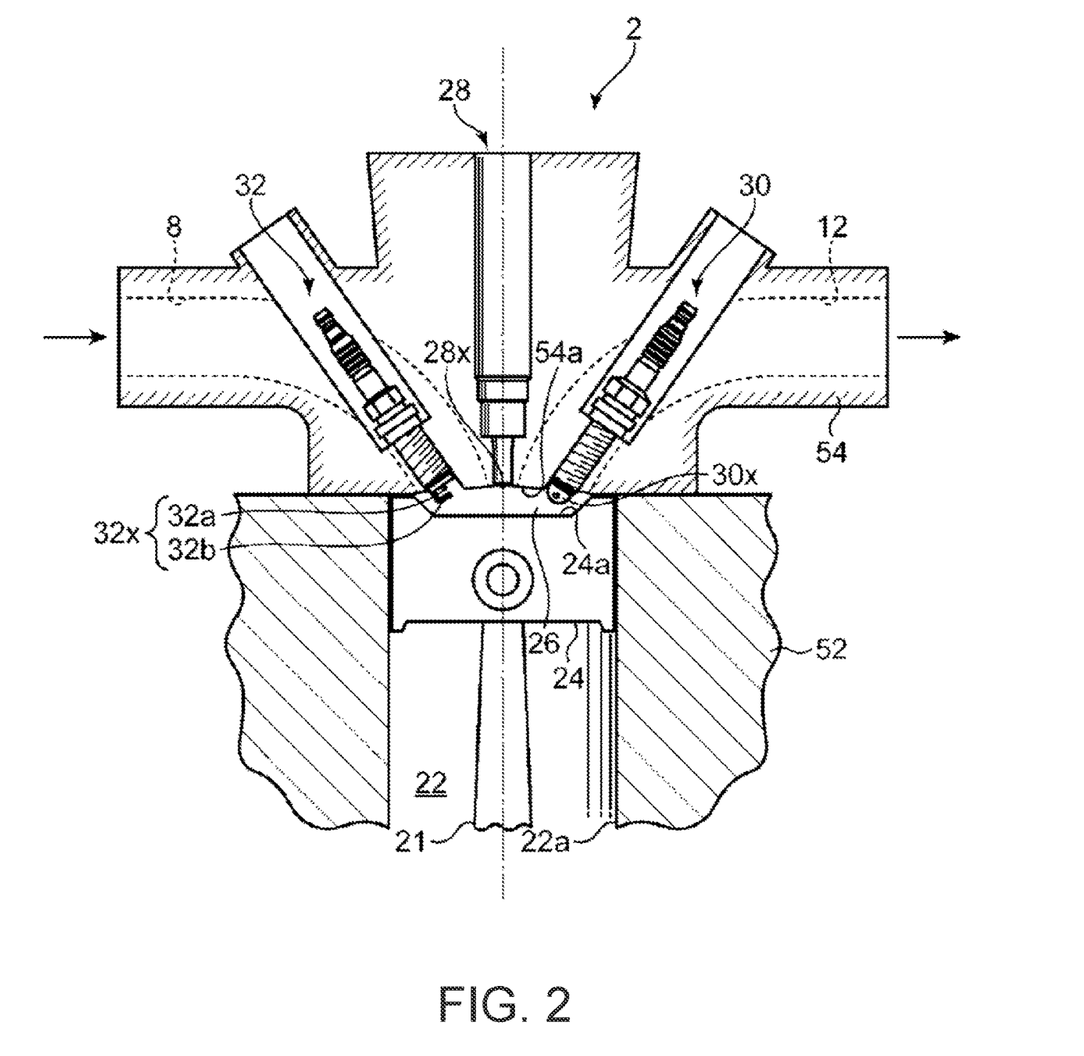
FIG. 2 is an outline cross-sectional view of an engine body.

FIG. 2 is an outline cross-sectional view of the engine body 2. In this embodiment, the engine body 2 is a multi-cylinder engine having a plurality of cylinders 22. For example, the engine body 2 has four cylinders 22 which are lined up single file (lined up in a direction perpendicular to the drawing sheet of FIG. 1). The engine body 2 includes a cylinder block 52 where the plurality of cylinders 22 are formed therein, a cylinder head 54 which has a bottom surface 54a which closes upper-end openings of the cylinders 22 and is attached to an upper surface of the cylinder block 52, and a plurality of pistons 24 reciprocatively accommodated in the respective cylinders 22. Note that although in this embodiment the side which goes toward the cylinder head 54 from the cylinder block 52 is treated as "upward" and the opposite side as "downward," these expressions are for facilitating the explanation and are not intended to limit the installation posture of the engine.

Main combustion chambers 26 are defined above the pistons 24 of the cylinders 22, respectively. Each main combustion chamber 26 is formed by an inner circumferential surface 22a of the cylinder 22 formed in the cylinder block 52, the bottom surface (lower surface) 54a of the cylinder head 54, and a crown surface 24a of the piston 24. Fuel is supplied to the main combustion chamber 26 by injection from an injector 28 (described later). The piston 24 reciprocates in the up-and-down direction by receiving an expansion force due to combustion of a mixture gas comprised of fuel and air.

A crankshaft 20 which is an output shaft of the engine body 2 is provided to a lower part of the cylinder block 52 (below the piston 24). The crankshaft 20 is coupled to the piston 24 of each cylinder 22 via a connecting rod 21, and rotates on a center axis according to the reciprocating movement of the piston 24.

In the cylinder head 54, an intake port 8 for introducing air supplied from the intake passage 4 into the main combustion chamber 26, and an exhaust port 12 for deriving the exhaust gas generated inside the main combustion chamber 26 to the exhaust passage 6 are formed for every cylinder 22. In the cylinder head 54, an intake valve 10 for opening and closing an opening of the intake port 8 on the main combustion chamber 26 side, and an exhaust valve 14 for opening and closing an opening of the exhaust port 12 on the main combustion chamber 26 side are provided for every cylinder 22. In this embodiment, two intake valves 10 and two exhaust valves 14 are provided per cylinder 22.

The intake valve 10 and the exhaust valve 14 are opened and closed in an interlocked manner with the rotation of the crankshaft 20 by valve operating mechanisms 16 and 18 disposed in the cylinder head 54, respectively. In the valve operating mechanism 16 for the intake valves 10, a variable valve lift mechanism (intake S-VT) 16a which electrically and variably controls a valve lift and an opening-and-closing timing of each intake valve 10 is provided. Similarly, in the valve operating mechanism 18 for the exhaust valves 14, a variable valve lift mechanism (exhaust S-VT) 18a which electrically and variably controls a valve lift and an opening-and-closing timing of each exhaust valve 14 is provided.

In the cylinder head 54, the injector 28, a main spark plug 32, and a subignition unit 30 are provided to each cylinder 22, as one set.

The injector 28 is an injection valve which injects fuel into the main combustion chamber 26. An injection port through which fuel is injected is formed in a tip-end part 28x of the injector 28. The injector 28 is attached to the cylinder head 54 so that the tip-end part 28x faces the main combustion chamber 26 from above. In this embodiment, the injector 28 is disposed so that its tip-end part 28x is located at the center of a ceiling surface of the main combustion chamber 26 (in detail, on the axis of the cylinder 22).

The main spark plug 32 carries out ignition by spark discharge to the mixture gas inside the main combustion chamber 26. An electrode part 32x for discharging sparks is provided to a tip end of the main spark plug 32. This electrode part 32x includes a center electrode 32a and a side electrode (ground) 32b. The main spark plug 32 is attached to the cylinder head 54 so that its electrode part 32x faces the main combustion chamber 26 from above. In this embodiment, the main spark plug 32 is disposed so that its electrode part 32x is located on the intake port 8 side with respect to the tip-end part 28x of the injector 28, in the ceiling surface of the main combustion chamber 26.

The subignition unit 30 is a device for injecting flame into the main combustion chamber 26. The details of the subignition unit 30 will be described later.

The intake passage 4 is connected to one of a plurality of side surfaces of the cylinder head 54 so as to communicate with the intake port 8 of each cylinder 22. In the intake passage 4, sequentially from an upstream side, an air cleaner 34 which removes foreign matter in intake air, an openable and closable throttle valve 36 which adjusts a flow rate of intake air, and a surge tank 38 are provided.

A downstream end of the intake passage 4 branches to a plurality of passages. The branch passages are connected to the respective intake ports 8. As for each cylinder 22, a swirl valve 56 (see FIG. 5) is provided to the branch passage coupled to one of the two intake ports 8 to open and close the intake port 8.

The exhaust passage 6 is connected to one of the plurality of side surfaces (the opposite side surface from the intake passage 4) of the cylinder head 54 so as to communicate with the exhaust port 12 of each cylinder 22. In the exhaust passage 6, a catalyst device 40 where a catalyst 41, such as a three-way catalyst, is built therein is provided.

The EGR device 50 is a device for recirculating part of the exhaust gas to the intake passage 4 as EGR gas, and introducing (recirculating) it via the intake passage 4 into the main combustion chamber 26 which communicates with the intake passage 4. The EGR device 50 has an EGR passage 42 which communicates the exhaust passage 6 with the intake passage 4, and an EGR valve 46 and an EGR cooler 44 which are provided to the EGR passage 42. An upstream end of the EGR passage 42 is connected to a downstream end of the catalyst device 40 which is a part of the exhaust passage 6 downstream of the catalyst 41, and a downstream end of the EGR passage 42 is connected to the surge tank 38. The EGR valve 46 is a valve which opens and closes the EGR passage 42 to adjust a flow rate of EGR gas. The EGR cooler 44 is a heat exchanger which cools EGR gas. The EGR cooler 44 is disposed upstream of the EGR valve 46.

Subignition Unit 30

Figure 3:
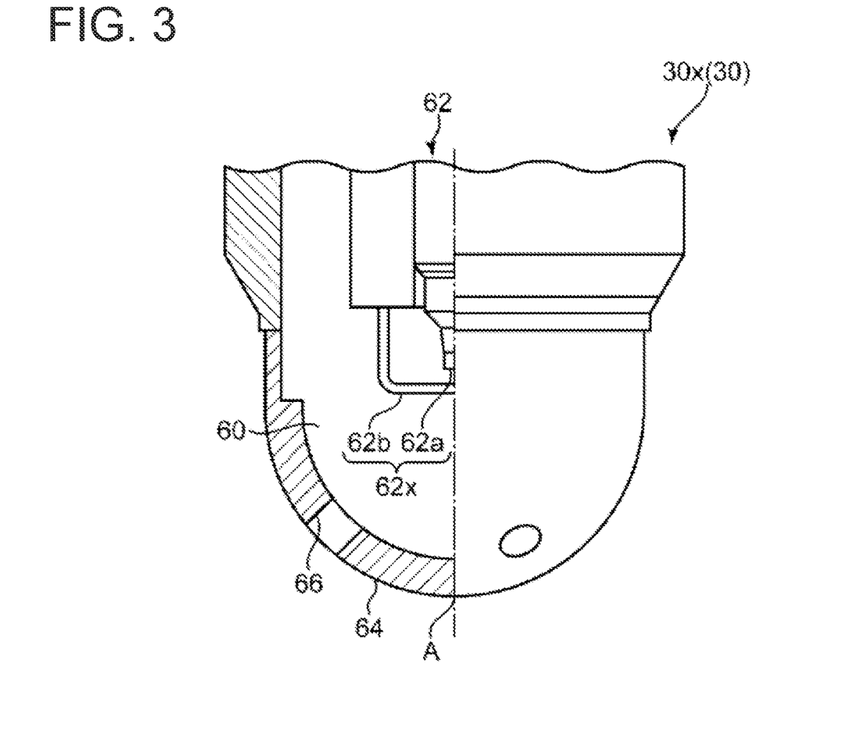
FIG. 3 is a partial cross-sectional view of a tip-end part of a subignition unit when seen from the side.

FIG. 3 is a partial cross-sectional view of a tip-end part 30x of the subignition unit 30 when seen from the side. FIG.

Figure 4:
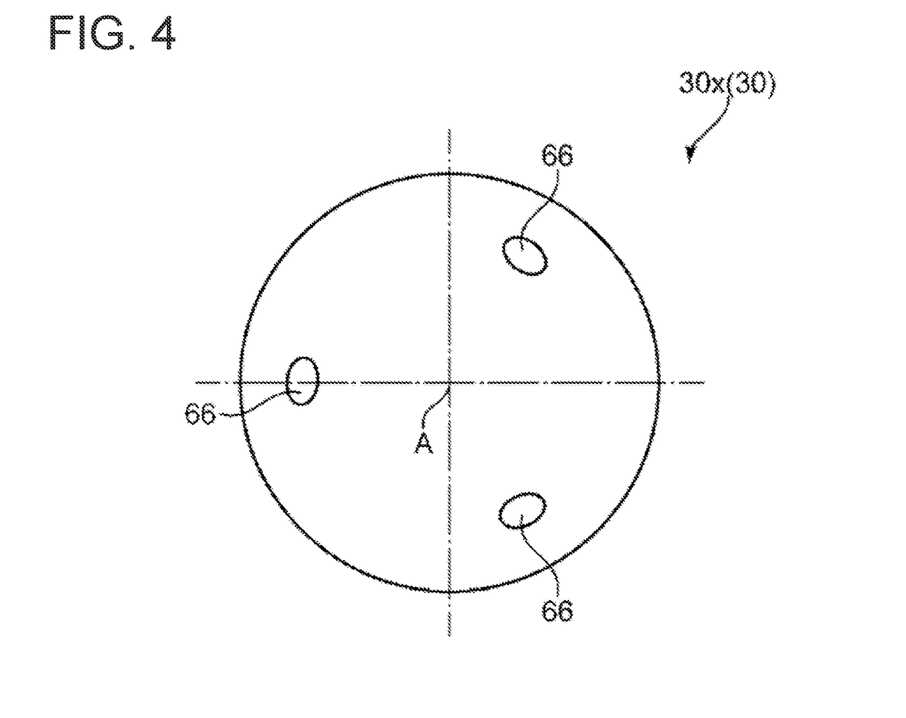
FIG. 4 is a plan view of the tip-end part of the subignition unit.

4 is a plan view of the tip-end part 30x of the subignition unit 30 (when seen from the tip-end side).

The subignition unit 30 has a sub spark plug 62 which ignites the mixture gas by spark discharge. An electrode part 62x for discharging sparks is provided to a tip end of the subspark plug 62. The electrode part 62x includes a center electrode 62a and a side electrode (ground) 62b. The subignition unit 30 is provided with a cover member 64 which is provided to the tip-end part 30x and covers the electrode part 62x of the subspark plug 62. A subchamber 60 which is a given space is defined inside the cover member 64. In other words, the subspark plug 62 is disposed so that its electrode part 62x faces the subchamber 60, and ignites the mixture gas inside the subchamber 60. The cover member 64 has a hollow semi-spherical shape which bulges to the tip-end side of the subignition unit 30. The cover member 64 is an example of a "partition" of the present disclosure.

As illustrated in FIG. 2, the subignition unit 30 is attached to the cylinder head 54 so that its tip-end part 30x faces the main combustion chamber 26 from above. In this embodiment, the subignition unit 30 is attached to a position of the ceiling surface of the main combustion chamber 26, on the exhaust port 12 side with respect to the injector 28. In this embodiment, in this attached state, substantially the entire cover member 64 is located inside the main combustion chamber 26.

A plurality of communicating holes 66 are formed in the cover member 64, which penetrate the cover member 64 to communicate the main combustion chamber 26 with the subchamber 60. An inside space of the cover member 64 (i.e., the subchamber 60) communicates with the main combustion chamber 26 via these communicating holes 66. Thus, in this embodiment, by attaching the thus-configured subignition unit 30 to the engine body 2, the subchamber 60 is formed in the engine body 2 so that it is divided from the main combustion chamber 26 by the cover member 64, and it communicates with the main combustion chamber 26 via the communicating holes 66.

In this embodiment, three communicating holes 66 are formed in the cover member 64. As illustrated in FIG. 4, the three communicating holes 66 are formed around the axis of the cover member 64 which passes through a vertex A of the cover member 64, at intervals of 120°. Further, as illustrated in FIG. 3, each communicating hole 66 is formed, in a side view, at a position of 45° from the vertex A. Moreover, the radius and the thickness of the cover member 64 are 5 mm and 1 mm, respectively, and the diameter of each communicating hole 66 is 1.2 mm.

The subignition unit 30 discharges flame to the main combustion chamber 26. In detail, when fuel is injected into the main combustion chamber 26 from the injector 28 and the mixture gas of air and fuel is formed inside the main combustion chamber 26, a part of the mixture gas is introduced into the subchamber 60 via the communicating holes 66. When the spark discharge is performed by the subspark plug 62 in a state where a sufficient amount of mixture gas exists inside the subchamber 60, the mixture gas starts combustion inside the subchamber 60, and flame propagates from near the electrode part 62x of the subspark plug 62 to the circumference. Then, this flame is discharged/ejected to the main combustion chamber 26 via the communicating holes 66, and propagates to the mixture gas inside the main combustion chamber 26.

Here, as described above, when the ignition by the main spark plug 32 is performed, the flame also propagates to the circumference from near the electrode part 32x of the main spark plug 32. Thus, if ignition is performed by both the main spark plug 32 and the subspark plug 62, and the mixture gas combust appropriately inside the main combustion chamber 26 and the subchamber 60, the flame will propagate to the mixture gas inside the main combustion chamber 26 from a plurality of positions. Therefore, the combustion speed of the mixture gas inside the main combustion chamber 26 is increased and fuel efficiency is improved, and generation of knocking and residue of unburnt mixture gas are suppressed.

Control System

Figure 5:
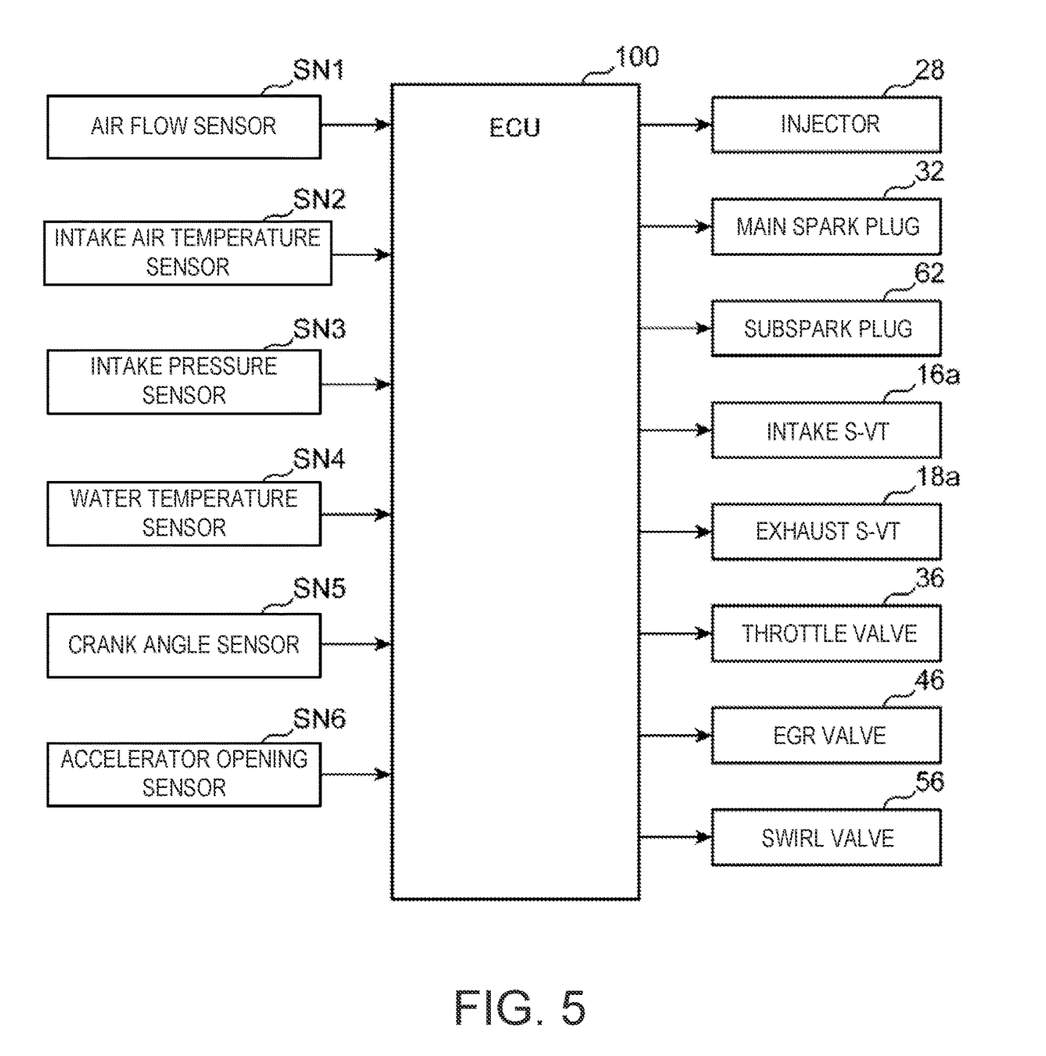
FIG. 5 is a view illustrating a control block of the engine.

FIG. 5 is a block diagram illustrating a control system of the engine. An electronic control unit (ECU) 100 illustrated in the figure is a device which comprehensively controls the engine, and is comprised of a microcomputer including a processor (e.g., a central processing unit (CPU)) which performs various calculation processings, memory such as a ROM and a RAM, and various kinds of input and output buses. The ECU 100 is an example of a "control device" of the present disclosure.

Detection information by the various sensors are inputted into the ECU 100. For example, detection values, from an air flow sensor SN1, an intake air temperature sensor SN2, an intake pressure sensor SN3, a water temperature sensor SN4, and a crank angle sensor SN5, which are provided to the engine system 1, and from an accelerator opening sensor SN6 which is provided to the vehicle, are inputted into the ECU 100. The air flow sensor SN1 detects a flow rate of intake air which passes through the intake passage 4 and is introduced into the engine body 2. The intake air temperature sensor SN2 and the intake pressure sensor SN3 detect a temperature and a pressure of intake air introduced into the engine body 2, respectively. The water temperature sensor SN4 detects a temperature of engine coolant for cooling the engine body 2. The crank angle sensor SN5 detects a crank angle which is a turning angle of the crankshaft 20, and an engine speed. The accelerator opening sensor SN6 detects an accelerator opening which is an opening of an accelerator pedal (not illustrated) mounted on the vehicle.

The ECU 100 performs various determinations, calculations, etc. based on the input signals from the various sensors. The ECU 100 is electrically connected to the injector 28, the main spark plug 32, the subspark plug 62, the EGR device 50 (in detail, the EGR valve 46), etc., and outputs electric signals for control to these devices based on the calculation results, etc.

Figure 6:
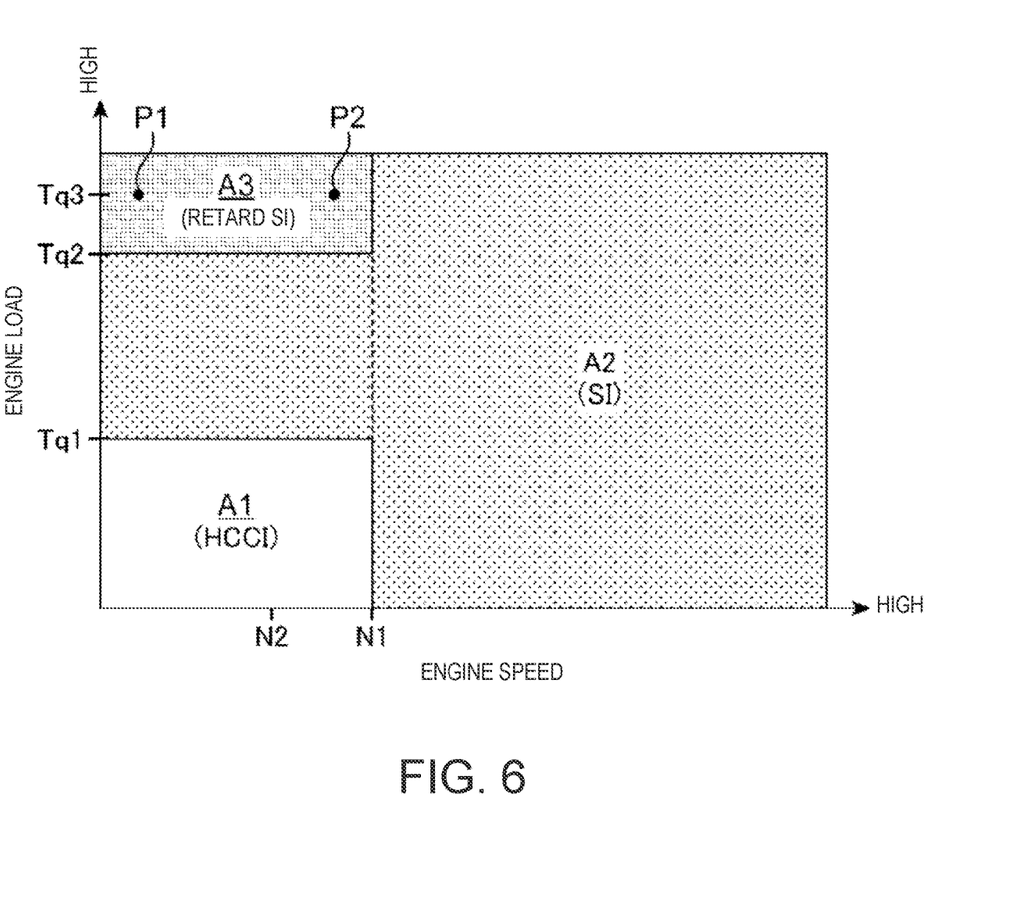
FIG. 6 is a map illustrating an operating range of the engine.

FIG. 6 is a map illustrating an operating range of the engine, where the horizontal axis is an engine speed and the vertical axis is an engine load. As illustrated in FIG. 6, the operating range of the engine is roughly divided into three ranges A1-A3 (a first range A1, a second range A2, and a third range A3) according to the control contents of the injector 28 and the spark plugs 32 and 62.

The first range A1 is a low-speed low-load range where the engine speed is below a given first engine speed N1 and the engine load is below a given first load Tq1. The third range A3 is a low-speed high-load range where the engine speed is below the first engine speed N1 and the engine load is above a given second load Tq2. The second range A2 includes the other ranges, which are comprised of a range where the engine speed is below the first engine speed N1, and the engine load is above the first load Tq1 and below the second load Tq2, and a range where the engine speed is above the first engine speed N1. The second load Tq2 is an example of a "reference load" of the present disclosure, the first engine speed N1 is an example of a "reference engine speed" of the present disclosure, and the third range A3 is an example of a "specific range" of the present disclosure.

In the first range A1, the injector 28 and the spark plugs 32 and 62 are controlled so that HCCI (Homogeneous Compression Charge Ignition) combustion is realized. In detail, in the first range A1, fuel is injected from the injector 28 in intake stroke. Further, the drive of the spark plugs 32 and 62 (ignition by these spark plugs 32 and 62) is suspended.

The injector 28 faces the main combustion chamber 26 as described above, and fuel injected from the injector 28 is diffusible throughout the main combustion chamber 26. Thus, in the first range A1, by fuel being injected from the injector 28 in intake stroke, fuel and air are fully mixed inside the main combustion chamber 26 by the time it reaches a compression top dead center. Then, in the first range A1, this fully-mixed mixture gas (premixed mixture gas) self-ignites near the compression top dead center by becoming high in the temperature and the pressure by the compression of the piston 24.

In the HCCI combustion, the air-fuel ratio of mixture gas (a ratio of the air weight inside the main combustion chamber 26 to the fuel weight inside the main combustion chamber 26) can be made leaner (higher) to a level where flame propagation is impossible, to improve fuel efficiency. Thus, in the first range A1, the opening of the throttle valve 36 is adjusted so that the air-fuel ratio of the mixture gas inside the main combustion chamber 26 becomes leaner (higher) than the stoichiometric air-fuel ratio (14.7:1).

In the second range A2, the injector 28 and the spark plugs 32 and 62 are controlled so that the flame propagation combustion (spark ignition combustion or SI combustion) is realized.

In detail, in the second range A2, fuel is injected from the injector 28 in intake stroke, similar to the first range A1. On the other hand, in the second range A2, the main spark plug 32 and the subspark plug 62 are activated to perform ignition by both the spark plugs 32 and 62. Further, the opening of the throttle valve 36 is adjusted so that the air-fuel ratio of the mixture gas inside the main combustion chamber 26 becomes near the stoichiometric air-fuel ratio. In the second range A2, a flame kernel is generated around the electrode parts 32x and 62x of the spark plugs 32 and 62 by the ignition of the spark plugs 32 and 62, and the flame then propagates from the flame kernel to the circumference so that the mixture gas inside the main combustion chamber 26 and the subchamber 60 combust.

Control Content in Third Range A3

Figure 7:
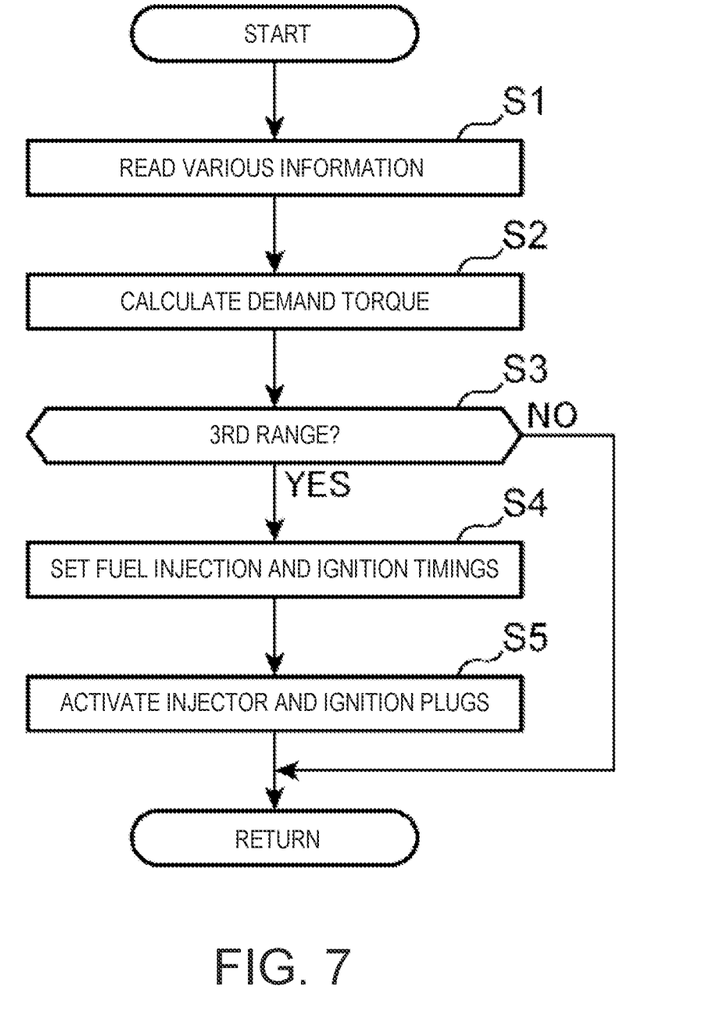
FIG. 7 is a flowchart illustrating a control procedure of an injector and spark plugs in a third range.

Next, the control content in the third range A3 that is one feature of the present disclosure is described. FIG. 7 is a flowchart illustrating a flow of the entire control procedure of the injector 28, the main spark plug 32, and the subspark plug 62 in the third range A3, which is carried out by the ECU 100.

The ECU 100 first reads variety of information (Step S1). The ECU 100 reads the engine speed detected by the crank angle sensor SN5, the accelerator opening detected by the accelerator opening sensor SN6, etc.

Next, the ECU 100 calculates a demand torque which is a torque required for the engine (i.e., engine load) (Step S2). The ECU 100 calculates the demand torque (engine load) based on the engine speed and the accelerator opening which are read at Step S1.

Next, the ECU 100 determines whether an operating point of the engine falls within the third range A3 (Step S3). In detail, the ECU 100 determines whether the current operating point of the engine falls within the third range A3 based on the engine speed read at Step S1 and the demand torque (engine load) calculated at Step S2.

If the determination at Step S3 is NO, and if the operating point of the engine does not fall within the third range A3, the ECU 100 ends this processing (it carries out the control of the first range A1 or the second range A2). On the other hand, if the determination at Step S3 is YES and the operating point of the engine falls within the third range A3, the ECU 100 transits to Step S4.

At Step S4, the ECU 100 sets a fuel injection timing which is a timing when a fuel injection by the injector 28 is started, a main ignition timing which is an ignition timing of the main spark plug 32 (a timing by the crank angle at which the main spark plug 32 carries out ignition or spark discharge), and a subignition timing which is an ignition timing of the subspark plug 62 (a timing by the crank angle at which the subspark plug 62 carries out ignition or spark discharge), based on the engine speed and the engine load.

Next, at Step S5, the ECU 100 activates the injector 28 so that the fuel injection is started at the fuel injection timing set at Step S4. Further, the ECU 100 activates the main spark plug 32 so that the ignition by the main spark plug 32 is performed at the main ignition timing set at Step S4. Further, the ECU 100 activates the subspark plug 62 so that the ignition by the subspark plug 62 is performed at the subignition timing set at Step S4.

The details of the fuel injection timing, the main ignition timing, and the subignition timing in the third range A3 set at Step S4 are described below.

Figure 8:
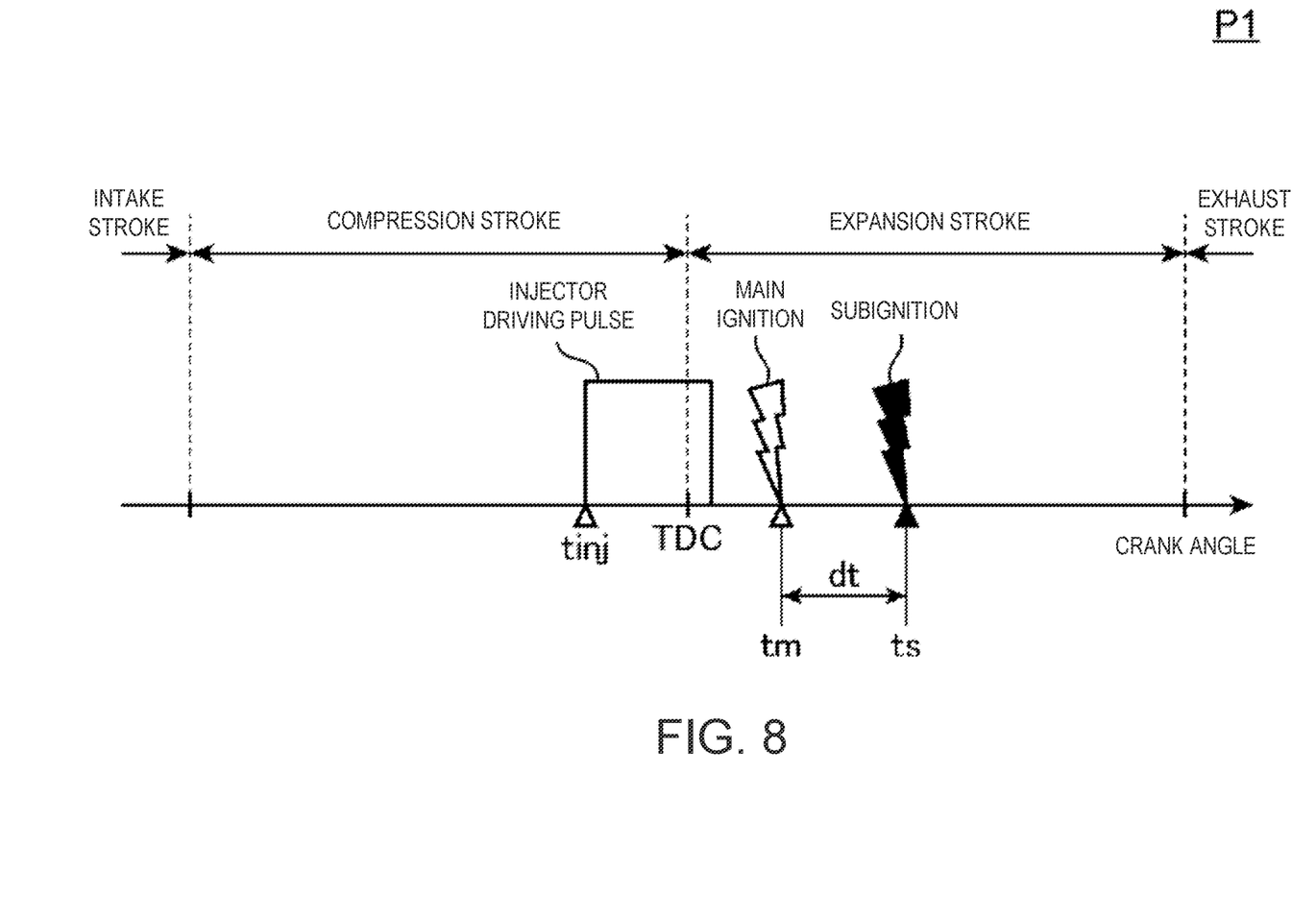
FIG. 8 is a view illustrating one example of a driving pulse, a main ignition timing, and a subignition timing of the injector in the third range.
Figure 9:
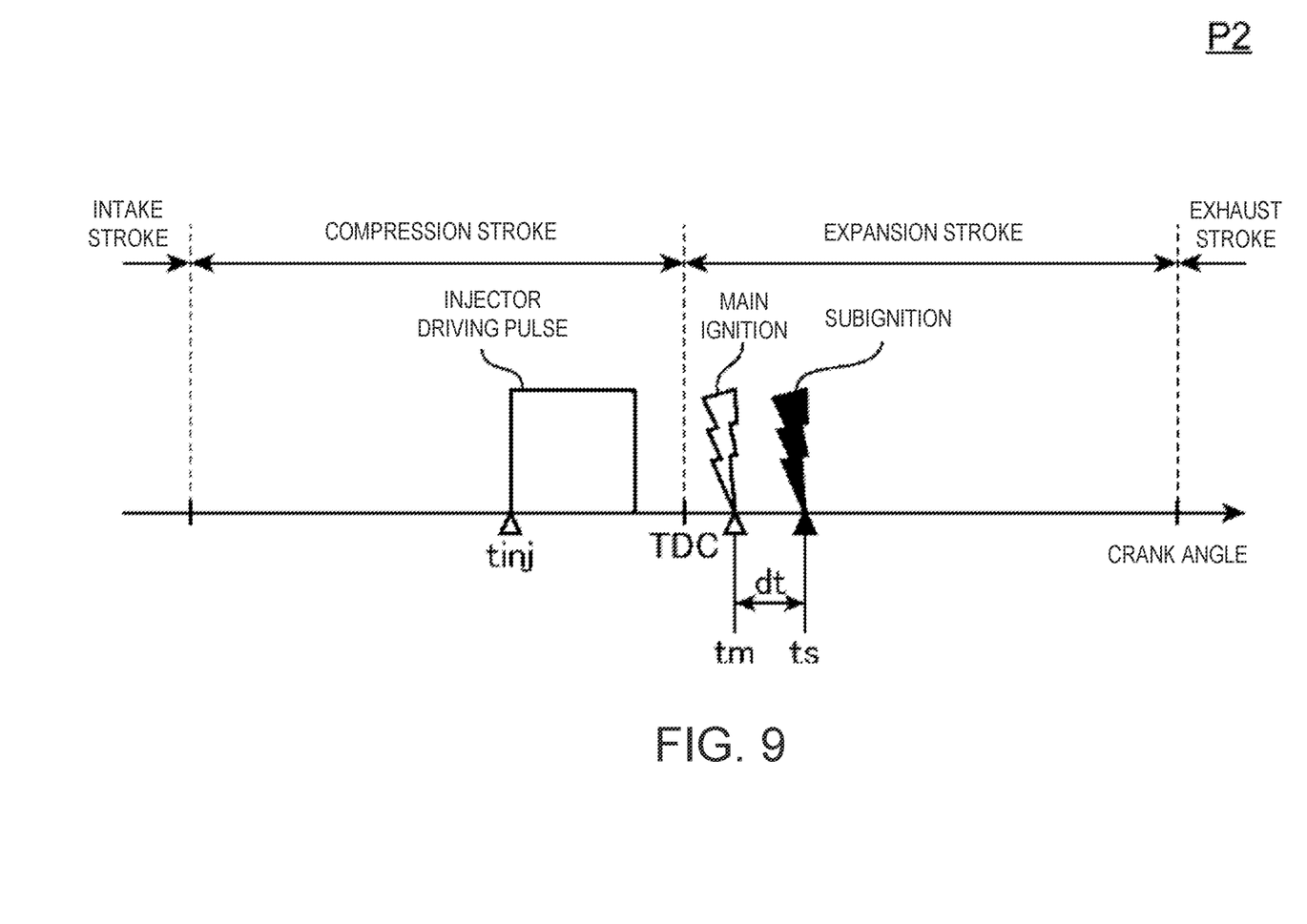
FIG. 9 is a view illustrating another example of the driving pulse of the injector, the main ignition timing, and the subignition timing in the third range.
Figure 10:
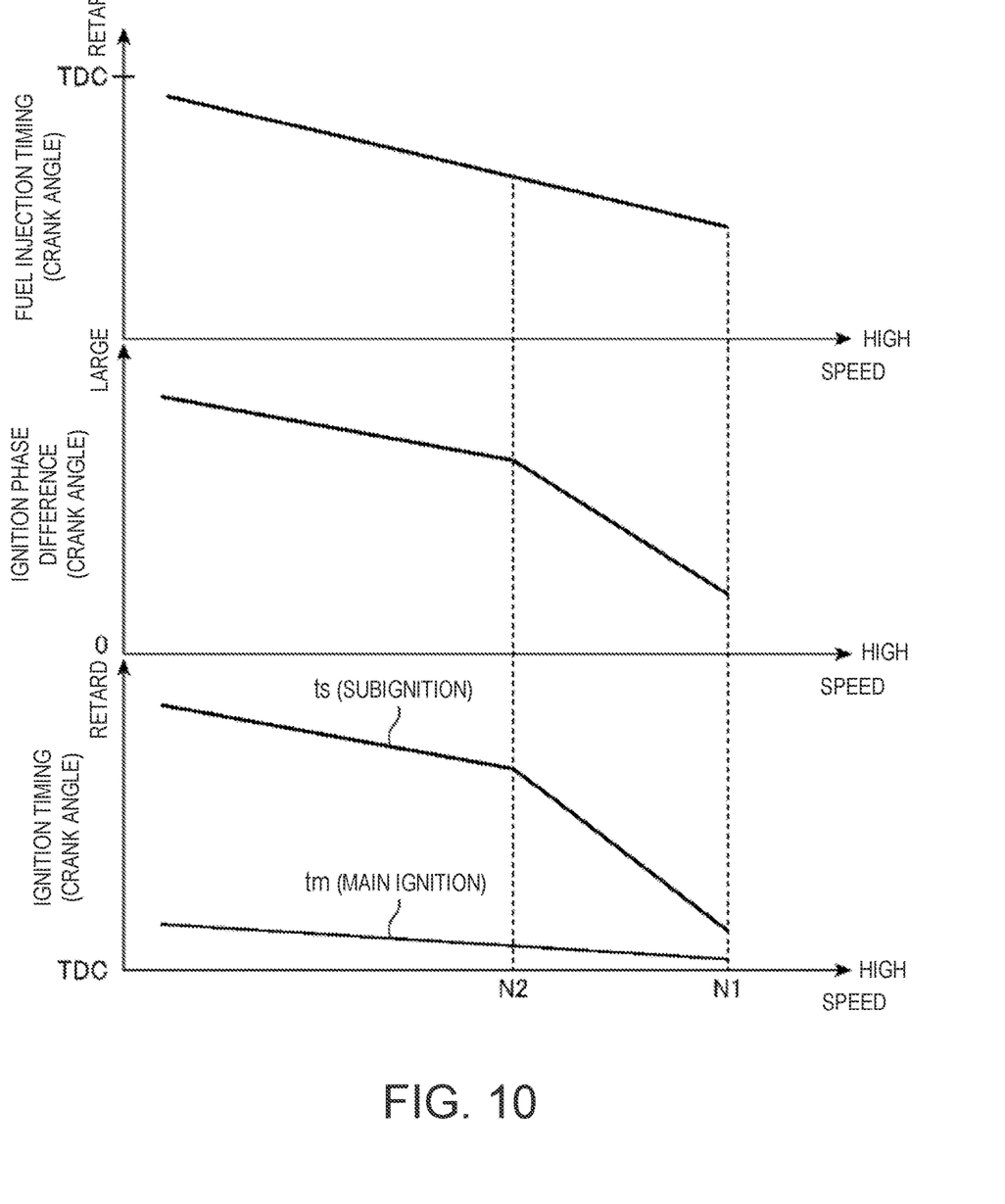
FIG. 10 is a view illustrating a relationship between an engine speed and each parameter in the third range.

FIGS. 8 and 9 are views illustrating a driving pulse of the injector 28, a main ignition timing tm, and a subignition timing ts at operating points P1 and P2 included in the third range A3, respectively. As illustrated in FIG. 6, the operating point P2 is a point where the engine load is Tq3, the same engine load as the operating point P1, and the engine speed is above that of the operating point P1. FIG. 10 is a view illustrating a relationship between the engine speed and each parameter in the third range A3. The top graph of FIG. 10 is a graph illustrating a relationship between the engine speed and a fuel injection timing tinj. The second graph of FIG. 10 is a graph illustrating a relationship between the engine speed and an ignition phase difference dt (described later). The third graph of FIG. 10 is a graph illustrating a relationship between the engine speed, and the main ignition timing tm and the subignition timing ts. Note that these graphs illustrate the relationship between the engine speed and each parameter when the engine load is fixed. Below, suitably, among the two operating points (for example, the operating points P1 and P2) where the engine loads are the same and the engine speeds are different, the operating point (P1) where the engine speed is low is referred to as a "low-speed point," and the operating point (P2) where the engine speed is high is referred to as a "high-speed point."

In the third range A3, the injector 28 and the spark plugs 32 and 62 are controlled so that SI combustion is realized, similar to the second range A2.

Note that, in the third range A3, when fuel is injected from the injector 28 in intake stroke similar to the second range A2, a preignition may occur. In detail, when the engine load is high, the temperature inside the main combustion chamber 26 becomes high because the combustion energy generated inside the main combustion chamber 26 becomes large. When the engine speed is lower, the time per one crank angle becomes longer. Therefore, in the third range A3 which is the low-speed high-load range where the engine speed is low and the engine load is high, when fuel is injected from the injector 28 in intake stroke similar to the second range A2, because the heat-receiving amount and the heat-receiving time of the mixture gas by the time reaching near the compression top dead center increase, the preignition in which the mixture gas self-ignites before a desired timing (i.e., before ignition takes place by the spark plug) occurs more easily.

Thus, in the third range A3, retard SI combustion in which fuel injection from the injector 28 is started in compression stroke is carried out, and the heat-receiving time of the mixture gas (fuel) by the time reaching near the compression top dead center is shortened (that is, the occurrence of the preignition is suppressed). That is, in the third range A3, the fuel injection timing tinj is set to the timing in compression stroke (controlled to be included in the compression stroke), and the fuel injection from the injector 28 into the main combustion chamber 26 is started in the compression stroke. Note that the end timing of the fuel injection by the injector 28 is not limited to a timing in compression stroke. For example, as illustrated in FIG. 8, in this embodiment, at the operating point where the engine speed is low in the third range A3, the fuel injection from the injector 28 ends at a timing in expansion stroke.

Here, the possibility that the preignition occurs becomes higher as the engine speed becomes lower also in the third range A3. Thus, in the third range A3, at the two operating points (for example, the operating points P1 and P2) where the engine loads are the same and the engine speeds are different, the fuel injection timing tinj at the low-speed point (P1) is retarded from the fuel injection timing tinj at the high-speed point (P2). That is, in the third range A3, the fuel injection timing tinj under the low-speed condition where the engine speed is low among the two conditions where the engine loads are the same and the engine speeds are different, is retarded from the fuel injection timing tinj under the high-speed condition where the engine speed is high. In this embodiment, as will be described later, in the third range A3, the fuel injection timing tinj is more retarded (a timing on the retarding side) as the engine speed becomes lower.

In this embodiment, as illustrated in FIG. 10, in the third range A3, the fuel injection timing tinj is more retarded as the engine speed becomes lower. Note that although in FIG. 10 the fuel injection timing tinj fluctuates in proportion to the engine speed, this relationship is not limited to the proportional relationship.

In the third range A3, both the main spark plug 32 and the subspark plug 62 are activated.

As illustrated in FIGS. 8 and 9, in the third range A3, the main ignition timing tm is advanced from the subignition timing ts so that ignition by the main spark plug 32 is first performed, and ignition by the subspark plug 62 is then performed. In this embodiment, the main ignition timing tm and the subignition timing ts in the third range A3 are both set as timings in expansion stroke. The ignition phase difference dt described above is a retard amount of the subignition timing ts with respect to the main ignition timing tm (i.e., a period by the crank angle from the main ignition timing tm to the subignition timing ts).

In the third range A3, at the two operating points (for example, the operating points P1 and P2) where the engine loads are the same and the engine speeds are different, the main ignition timing tm at the low-speed point (P1) is retarded from the main ignition timing tm at the high-speed point (P2), and the subignition timing ts at the low-speed point (P1) is retarded from the subignition timing ts at the high-speed point (P2).

In the third range A3, at the two operating points (for example, the operating points P1 and P2) where the engine loads are the same and the engine speeds are different, the retard amount of the subignition timing ts at the low-speed point (P1) with respect to the subignition timing ts at the high-speed point (P2) is larger than the retard amount of the main ignition timing tm at the low-speed point (P1) with respect to the main ignition timing tm at the high-speed point (P2). In connection with this, in the third range A3, the ignition phase difference dt (the retard amount of the subignition timing ts from the main ignition timing tm) is controlled as follows. That is, at the two operating points (for example, the operating points P1 and P2) where the engine loads are the same and the engine speeds are different, the ignition phase difference dt at the low-speed point (P1) is larger than the ignition phase difference dt at the high-speed point (P2).

As illustrated in FIG. 10, in this embodiment, in the third range A3, the main ignition timing tm and the subignition timing ts are retarded as the engine speed becomes lower.

Further, the main ignition timing tm and the subignition timing ts are set to the timings so that the ignition phase difference dt becomes larger as the engine speed becomes lower. That is, a rate of change in the subignition timing ts with respect to the engine speed is larger than a rate of change in the main ignition timing tm.

Further, the main ignition timing tm is set so that its rate of change with respect to the engine speed is fixed against all the engine speeds in the third range A3, and the subignition timing ts is set so that its rate of change with respect to the engine speed is larger when the engine speed is above a given engine speed N2 than when the engine speed is below the engine speed N2. In connection with this, in the third range A3, a rate of change in the ignition phase difference dt with respect to the engine speed is larger when the engine speed is on the high-speed side above the engine speed N2 than when the engine speed is on the low-speed side below the engine speed N2.

Note that, in this embodiment, the timings set as described above (the fuel injection timing tinj, the main ignition timing, and the subignition timing ts) are stored beforehand in the ECU 100 as a map with respect to the engine speed and the engine load. At Step S4 described above, the ECU 100 extracts values corresponding to the current engine load and the current engine speed from the map stored in the ECU 100.

Operation, Etc.

As described above, in this embodiment, since the main combustion chamber 26 and the subchamber 60 are provided to the engine body 2, fuel efficiency and emission performance can be improved by combustion of the mixture gas in these two combustion chambers 26 and 60. In addition, since the injector 28 which is the device for injecting fuel is provided only to the main combustion chamber 26 and is not provided to the subchamber 60, the structure of the engine system can be simplified, compared with the case where the injector 28 is provided to each of the main combustion chamber 26 and the subchamber 60, and therefore, it becomes advantageous in terms of cost. Further, since the injector 28 is disposed so as to inject fuel into the main combustion chamber 26, fuel can be diffused uniformly throughout the main combustion chamber 26. Therefore, in the low-speed low-load first range A1, suitable HCCI combustion can be realized.

Further, in the third range A3 which is the low-speed high-load range, the fuel injection timing tinj is set to the timing in compression stroke, and at the two operating points (for example, the operating points P1 and P2) where the engine loads are the same and the engine speeds are different, the fuel injection timing tinj at the low-speed point (P1) is retarded from the fuel injection timing tinj at the high-speed point (P2). Therefore, as described above, in the third range A3, it can avoid that the heat-receiving time of the mixture gas by the time reaching near the compression top dead center becomes excessive, to suppress the occurrence of the preignition.

However, when the fuel injection timing tinj is set to the timing in compression stroke, since fuel is not spread throughout the main combustion chamber 26 by near the compression top dead center, it becomes difficult to introduce the sufficient amount of fuel into the subchamber 60 with only the compressing action of the piston 24, and therefore, it becomes difficult to realize suitable combustion inside the subchamber 60. Particularly, in this embodiment, since the subignition timing ts is set to the timing in expansion stroke after the piston 24 begins descending, a possibility that the mixture gas inside the subchamber 60 at the subignition timing (fuel) will be insufficient becomes high with only the compressing action of the piston 24. Further, if ignition by the sub spark plug 62 is performed after waiting for the diffusion of fuel being fully progressed and the introduction of the sufficient mixture gas into the subchamber 60 and ignition by the main spark plug 32 is then performed, since the ignition timing of the main spark plug 32 becomes a very late timing in the expansion stroke, the possibility that the mixture gas inside the main combustion chamber 26 does not combust appropriately becomes high.

On the other hand, in this embodiment, in the third range A3, the subignition timing ts is retarded from the main ignition timing tm. Therefore, the suitable combustion inside the main combustion chamber 26 can be realized with the ignition by the main spark plug 32 near the compression top dead center. Further, the mixture gas (fuel) can be pushed into the subchamber 60 from the main combustion chamber 26 by the pressure increase in the main combustion chamber 26 produced by the combustion inside the main combustion chamber 26. Therefore, the sufficient amount of the mixture gas (fuel) exists inside the subchamber 60, when ignition by the subspark plug 62 is performed, to realize the suitable combustion inside the subchamber 60.

Thus, according to this embodiment, in the third range A3, since the fuel injection timing tinj is set to the timing in compression stroke, the occurrence of preignition can be suppressed, the suitable combustion inside the main combustion chamber 26 and the subchamber 60 can be realized, and fuel efficiency and exhaust performance can be improved.

Further, in this embodiment, in the third range A3, the ignition phase difference dt at the low-speed point where the fuel injection timing tinj is comparatively retarded is larger than the ignition phase difference dt at the high-speed point where the fuel injection timing tinj is comparatively advanced. That is, the period after the introduction of the mixture gas (fuel) into the subchamber 60 accompanying the pressure increase in the main combustion chamber 26 begins, and until the ignition by the subspark plug 62 is performed (i.e., the introducing period of the mixture gas (fuel) into the subchamber 60) is longer at the low-speed point where the introduction of the mixture gas (fuel) into the subchamber 60 is more difficult with only the compressing action of the piston 24 because the fuel injection timing tinj is closer to the compression top dead center. Therefore, at the low-speed point, the sufficient amount of the mixture gas (fuel) can securely be introduced into the subchamber 60 to securely realize the suitable combustion of the mixture gas inside the subchamber 60. Further, at the high-speed point, since the amount of mixture gas (fuel) inside the subchamber 60 being secured, and the combustion inside the subchamber 60 begins comparatively early after the combustion inside the main combustion chamber 26 begins, the suitable combustion of the mixture gas inside the subchamber 60 can be realized, and the combustion period can be shortened, thereby more securely improving fuel efficiency.

Particularly, in this embodiment, at the operating point in the third range A3 where the engine speed is low, since the fuel injection from the injector 28 is finished at the timing in expansion stroke and the compressing action of the piston 24 does not affect a portion of the fuel, the amount of the mixture gas (fuel) inside the subchamber 60 easily becomes insufficient. On the other hand, according to this embodiment, it is possible to introduce the sufficient amount of the mixture gas (fuel) into the subchamber 60 also at such an operating point where the engine speed is low and the fuel injection ends at the timing in the expansion stroke.

Further, in this embodiment, in the third range A3, the ignition phase difference dt becomes larger as the engine speed becomes lower. Therefore, fuel efficiency can be made appropriate at each engine speed, and the suitable combustion inside the subchamber 60 can securely be realized.

Here, in this embodiment, in the third range A3, since the subignition timing ts is set to the timing in the expansion stroke, if the ignition phase difference dt is made excessively large, the subignition timing ts becomes an excessively late timing in the expansion stroke. As the expansion stroke progresses, since the pressure inside the main combustion chamber 26 decreases significantly, the pushing effect of the mixture gas (fuel) from the main combustion chamber 26 into the subchamber 60 becomes smaller. Further, when the combustion start timing in the subchamber 60 becomes the excessively late timing in the expansion stroke, fuel efficiency may become worse. On the other hand, in this embodiment, in the third range A3, the rate of change in the ignition phase difference dt with respect to the engine speed is larger when the engine speed is on the high-speed side above the engine speed N2 than when the engine speed is on the low-speed side below the engine speed N2. Therefore, the ignition phase difference dt becoming excessively large on the low-speed side (i.e., the subignition timing ts becomes the excessively late timing in the expansion stroke) can be avoided, thereby securely making fuel efficiency appropriate.

Further, in this embodiment, in the third range A3, the main ignition timing tm at the low-speed point where the fuel injection timing tinj is on the retarding side is set to the timing on the retarding side of the main ignition timing tm at the high-speed point where the fuel injection timing tinj is comparatively advanced. Therefore, at both the low-speed point and the high-speed point, the period from the fuel injection timing tinj to the main ignition timing tm (i.e., a mixing period of fuel with air until the main ignition timing tm) can be secured, thereby more securely realizing the suitable combustion of the mixture gas inside the main combustion chamber 26.

Further, in this embodiment, in the third range A3, the main ignition timing tm is set to the timing in the expansion stroke. Thus, the period from the fuel injection timing tinj to the main ignition timing tm (i.e., the mixing period of fuel with air until the main ignition timing tm) can be particularly extended, thereby further securely realizing the suitable combustion inside the main combustion chamber 26.

Modifications

The concrete shape and size of the cover member 64 of the subignition unit 30 are not limited to the above configuration. Further, the number and size of the communicating holes 66 formed in the cover member 64 are not limited to the above configuration. Moreover, the attached position of the subignition unit 30 is not limited to the above position. For example, the subignition unit 30 may be provided to the exhaust port 12 side with respect to the tip-end part 28x of the injector 28.

Although in the above embodiment the maximum engine speed of the first range A1 is the same as the maximum engine speed of the third range A3, these upper limits may not be the same. That is, the maximum engine speed of the first range A1 may not be the first engine speed N1 which is the maximum engine speed of the third range A3.

Further, the control contents of the first range A1 and the second range A2 are not limited to the above controls.

Further, the detailed structure, such as the number of cylinders of the engine body 2, is not limited to the above structure.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine System
2 Engine Body
24 Piston
28 Injector
26 Main Combustion Chamber
30 Subignition Unit
32 Main Spark Plug
52 Cylinder Block
54 Cylinder Head
60 Subchamber
62 Sub spark Plug
64 Cover Member (Partition)
66 Communicating Hole
100 ECU (Control Device)

What is claimed is:

1. An engine system, comprising:
a cylinder block and a cylinder head that form a cylinder;
a piston reciprocatably accommodated in the cylinder;
a main combustion chamber defined by the cylinder block, the cylinder head, and the piston;
a subchamber that is separated from the main combustion chamber by a partition, and communicates with the main combustion chamber through a communicating hole formed in the partition;
an injector that injects fuel into the main combustion chamber;
a main spark plug that ignites a mixture gas inside the main combustion chamber;
a subspark plug that ignites the mixture gas inside the subchamber; and
a control device that is electrically connected to, and outputs an electric signal for control to, the injector, the main spark plug, and the subspark plug,
wherein when the engine is operated in a specific range where an engine speed is below a given reference engine speed and an engine load is above a given reference load, the control device is configured to:
control the injector so that a fuel injection timing that is an injection timing of fuel by the injector is included in compression stroke, and cause the main spark plug and the subspark plug to perform ignitions after the fuel injection timing;
when two conditions in the specific range where the engine loads are the same and the engine speeds are different include a low-speed condition where the engine speed is lower and a high-speed condition where the engine speed is higher, control the injector so that the fuel injection timing under the low-speed condition becomes later than the fuel injection timing under the high-speed condition; and
control the main spark plug and the subspark plug so that a subignition timing that is an ignition timing of the subspark plug becomes a timing on the retarding side of a main ignition timing that is an ignition timing of the main spark plug, and an ignition phase difference that is a retard amount of the subignition timing with respect to the main ignition timing becomes larger under the low-speed condition than under the high-speed condition.

2. The engine system of claim 1, wherein the control device sets the main ignition timing under the low-speed condition to a timing on the retarding side of the main ignition timing under the high-speed condition, and sets the subignition timing under the low-speed condition to a timing on the retarding side of the subignition timing under the high-speed condition.

3. The engine system of claim 2, wherein the control device makes a retard amount of the subignition timing under the low-speed condition with respect to the subignition timing under the high-speed condition larger than a retard amount of the main ignition timing under the low-speed condition with respect to the main ignition timing under the high-speed condition.

4. The engine system of claim 3, wherein the control device sets the subignition timing in the specific range to a timing in expansion stroke.

5. The engine system of claim 4, wherein the control device controls the main spark plug and the subspark plug so that, during operation in the specific range, the ignition phase difference becomes larger as the engine speed becomes lower, and a rate of change in the ignition phase difference with respect to the engine speed becomes larger on the high-speed side than on the low-speed side.

6. The engine system of claim 5, wherein the control device sets the main ignition timing in the specific range in expansion stroke.

7. The engine system of claim 1, wherein the control device sets the subignition timing in the specific range to a timing in expansion stroke.

8. The engine system of claim 2, wherein the control device sets the subignition timing in the specific range to a timing in expansion stroke.

9. The engine system of claim 7, wherein the control device sets the main ignition timing in the specific range in expansion stroke.

10. The engine system of claim 8, wherein the control device sets the main ignition timing in the specific range in expansion stroke.

11. The engine system of claim 4, wherein the control device sets the main ignition timing in the specific range in expansion stroke.

12. The engine system of claim 1, wherein the main spark plug is attached so that an electrode part thereof is located on an intake port side in a ceiling surface of the main combustion chamber, and the subspark plug is attached to a position on an exhaust port side in the ceiling surface of the main combustion chamber.

13. The engine system of claim 2, wherein the main spark plug is attached so that an electrode part thereof is located on an intake port side in a ceiling surface of the main combustion chamber, and the subspark plug is attached to a position on an exhaust port side in the ceiling surface of the main combustion chamber.

14. The engine system of claim 12, wherein the injector is disposed so that a tip-end part thereof is located at the center of the ceiling surface of the main combustion chamber.

15. The engine system of claim 13, wherein the injector is disposed so that a tip-end part thereof is located at the center of the ceiling surface of the main combustion chamber.

\* \* \* \* \*